(12) United States Patent
Steinbrink et al.

(10) Patent No.: US 11,248,937 B2
(45) Date of Patent: Feb. 15, 2022

(54) HOLDER FOR A SENSOR UNIT

(71) Applicant: Robert Bosch GmbH, Stuttgart (DE)

(72) Inventors: Ronald Steinbrink, Hoerselberg-Hainich (DE); Steffen Schulze, Eisenach (DE); Anwar Hegazi, Erfurt (DE)

(73) Assignee: Robert Bosch GmbH, Stuttgart (DE)

( * ) Notice: Subject to any disclaimer, the term of this patent is extended or adjusted under 35 U.S.C. 154(b) by 55 days.

(21) Appl. No.: 16/637,073

(22) PCT Filed: Aug. 30, 2018

(86) PCT No.: PCT/EP2018/073329
§ 371 (c)(1),
(2) Date: Feb. 6, 2020

(87) PCT Pub. No.: WO2019/057463
PCT Pub. Date: Mar. 28, 2019

(65) Prior Publication Data
US 2020/0240817 A1    Jul. 30, 2020

(30) Foreign Application Priority Data

Sep. 19, 2017 (DE) ..................... 10 2017 216 533.2

(51) Int. Cl.
*G01P 1/02* (2006.01)
*G01D 11/24* (2006.01)

(52) U.S. Cl.
CPC .............. *G01D 11/245* (2013.01); *G01P 1/02* (2013.01)

(58) Field of Classification Search
CPC ................................ G01D 11/245; G01P 1/02
See application file for complete search history.

(56) References Cited

U.S. PATENT DOCUMENTS

| 8,700,353 B2 * | 4/2014 | Khazanov ............... G01P 1/023 |
| | | 702/141 |
| 10,566,744 B1 * | 2/2020 | Schmid ................ G01D 11/245 |

(Continued)

FOREIGN PATENT DOCUMENTS

| DE | 102 22 204 A1 | 11/2003 | |
| DE | 10222204 A1 * | 11/2003 | ......... B29C 45/1671 |
| DE | 10 2004 011 100 A1 | 9/2005 | |

(Continued)

OTHER PUBLICATIONS

International Search Report corresponding to PCT Application No. PCT/EP2018/073329, dated Dec. 20, 2018 (German and English language document) (6 pages).

*Primary Examiner* — Jamel E Williams
(74) *Attorney, Agent, or Firm* — Maginot, Moore & Beck LLP

(57) ABSTRACT

A holder for a sensor unit, has at least two bus bars, wherein an internal electrical interface to a measuring transducer is formed at first ends of the at least two bus bars, and an external electrical interface for a connector module is formed at second ends of the at least two bus bars. An alignment component surrounds the at least two bus bars and is arranged between the internal electrical interface and the external electrical interface, wherein an alignment of the alignment component defines an outgoing direction of the second ends of the at least two bus bars and of the external electrical interface.

18 Claims, 7 Drawing Sheets

(56) References Cited

U.S. PATENT DOCUMENTS

| | | | |
|---|---|---|---|
| 2008/0198559 A1* | 8/2008 | Mueller | H01R 13/6658 |
| | | | 361/728 |
| 2014/0338448 A1* | 11/2014 | Ashino | G01L 19/143 |
| | | | 73/488 |

FOREIGN PATENT DOCUMENTS

| | | | | |
|---|---|---|---|---|
| DE | 10 2005 012 709 A1 | 9/2006 | | |
| DE | 10 2005 043 413 A1 | 3/2007 | | |
| DE | 10 2006 029 980 A1 | 1/2008 | | |
| DE | 10 2008 018 199 A1 | 10/2009 | | |
| DE | 102008018199 A1 * | 10/2009 | | H05K 5/062 |
| DE | 10 2009 046 439 A1 | 5/2011 | | |
| DE | 102009046439 A1 * | 5/2011 | | G01P 1/026 |
| DE | 10 2014 202 192 A1 | 8/2015 | | |

* cited by examiner

HOLDER FOR A SENSOR UNIT

This application is a 35 U.S.C. § 371 National Stage Application of PCT/EP2018/073329, filed on Aug. 30, 2018, which claims the benefit of priority to Serial No. DE 10 2017 216 533.2, filed on Sep. 19, 2017 in Germany, the disclosures of which are incorporated herein by reference in their entirety.

BACKGROUND

The disclosure is based on a holder for a sensor unit, a sensor unit for a vehicle comprising a holder of this kind, and an assembly method for a sensor unit of this kind.

Known directly plugged sensor units which are designed as rotation speed sensors are constructed by electrically connecting a measuring transducer, which comprises, for example, a sensor element and a sensor circuit which is designed as an application-specific integrated circuit (ASIC), to at least two busbars. Here, an internal electrical interface to the measuring transducer is formed at first ends of the at least two busbars, and an external electrical interface is formed at second ends of the at least two busbars. The customer-specific application to the vehicle and also the insulation of the electrical components is generally implemented by encapsulation by injection molding with thermoplastic or thermoset material. The manufacture of a mating plug for the external electrical interface with a line and components for application to the vehicle is performed separately at the customer's premises or at their supplier's premises. For the injection-molding encapsulation process, the measuring transducer is generally fixed by an integrated holder. This also implements the plug geometry. Sealing off between the holder and the injection-molded encapsulation is performed by means of small rib geometries or sealing ribs which melt owing to the temperature during the filling process and therefore ensure an interlocking and cohesive connection. The electrical connection between the at least two busbars and the electrical conductor is usually performed with the aid of a terminal by laser soldering, crimping or direct welding of the conductor onto the corresponding busbar. The high cycle times and complicated tools, which have to represent both holders and also plug contours, can be considered disadvantages of the known construction. As a result, high cooling times are produced for the thermoplastic injection-molding processes. The process is also complicated by the complex handling of the busbars, the high variance in plug geometries and different positions of a fastening module which are produced depending on the installation position of the sensor unit on the vehicle. In addition, the various applications and tool requirements, such as differences in shrinkage, different injection points, various injection-molding machines, cooling concepts etc., require tests and/or additional measures which are sometimes costly. Furthermore, the encapsulation by injection molding of the measuring transducer with thermoplastic in different geometries requires, in each new variant, considerable approval expenditure in terms of design and process, depending on the customer application or installation requirements of the sensor unit in the vehicle, in order to avoid thermal and mechanical stresses during the injection-molding process onto the measuring transducer.

DE 10 2014 202 192 A1 discloses a sensor unit for a vehicle, comprising a main body which carries a sensor circuit comprising at least one sensor contact and has a sensor contact-making arrangement, which is electrically connected to the at least one sensor contact by means of at least one sensor mating contact, at a first end and a cable contact-making arrangement, which is electrically connected to a connection cable by means of at least one cable contact, at a second end.

DE 10 2008 018 199 A1 discloses an electrical assembly consisting of a leadframe as an electrical conductor track structure, electrical components on this leadframe, and a filler compound composed of non-conductive material.

DE 102 22 204 A1 discloses a holding arrangement, in particular for a sensor arrangement, which is provided with a sensor element and an evaluation electronics system for processing the electrical signal which can be picked off from the sensor element, and with a holding element, with which electrical contact can be made, for the sensor element and the evaluation electronics system.

DE 10 2009 046 439 A1 discloses a sensor unit comprising a sensor core, which has a sensor element and a holding element for holding the sensor element, and a plastic sheathing which surrounds the sensor core.

DE 10 2004 011 100 A1 discloses a motion sensor, in particular a rotation speed sensor for the wheel rotation of a motor vehicle, and also a method for producing a motion sensor, which motion sensor has an integrated circuit, which can be connected by means of an electrical cable, comprising a measuring transducer and an electronic circuit arrangement for processing the measurement signals.

DE 10 2005 043 413 A1 discloses a main module for a motion sensor, in particular rotation speed sensor, phase sensor or transmission sensor for motor vehicles. The main module has a plurality of busbars for making contact with an integrated circuit for the purpose of sensing a movement. The main module comprises at least one wiring means which is arranged on the busbars, wherein the busbars and the wiring means are at least partially surrounded by a sheathing. The substantially cylindrical sheathing of the main module has a wedge-shaped recess which runs in the axial direction, so that electrical contact can be made with the busbars, in each case at one end, by way of the integrated circuit from the outside. At the other end, the busbars protrude out of the sheathing of the main module. A radially oriented cutout, which is surrounded by a substantially U-shaped edge, is provided at a head end of the main module. The recess and the cutout serve for receiving the integrated circuit which is fitted on carrier strips. In addition, a further busbar arrangement is provided, which consists of a plurality of busbars with which contact is made by way of those ends of the busbars of the main module which protrude beyond the sheathing. The main module can be matched in a customer-specific manner to the respective requirements in respect of plug design and housing geometry by selecting the further busbar arrangement.

DE 10 2005 012 709 A1 discloses, for example, a magnetic field sensor, in particular a rotation speed and/or direction of rotation sensor for a vehicle wheel or for the drivetrain of a vehicle. The magnetic field sensor has a holder of the generic type for a sensor element and possibly further sensor components. The holder is designed as a plastic injection-molded part and has a pocket-like cutout in the region of its read-side end face, in which cutout the sensor element is supported at least in the direction of the injection pressure during final encapsulation by injection molding with plastic, and is therefore protected against mechanical damage. A connection arrangement for the described magnetic field sensor has a connection element which has two connection pieces in a first contact-making region, said connection pieces each being electrically and mechanically connected to the stripped ends of a connection cable by means of a crimped connection. The connection pieces can be electrically and mechanically connected to connection lines of a sensor element in a second contact-making region. The connection element is at least partially encased by a plastic injection-molded encapsulation which has a window-like cutout in a transition region between the first contact-making region and the second contact-making region, said cutout being sealed off during the injection-molding process for the plastic injection-molded encapsulation in the injection-molding die. These connection pieces are initially in one piece in order to make it easier to position the connection element before the injection-molding process, and are then electrically insulated from one another by separating the connecting parts.

DE 10 2006 029 980 A1 discloses a, for example, a sensor arrangement, in particular a sensor arrangement for sensing the rotation speed and/or direction of rotation for a vehicle wheel or for the drivetrain of a vehicle. The sensor arrangement comprises a holder and at least one sensor element which is arranged on the holder and comprises at least one connection, wherein electrical contact is made with the connection by way of at least one line of a connection cable at at least one connecting point by means of corresponding connecting means. The stripped ends of the connection cable can be electrically connected to the connecting means, for example, by a crimped connection in each case. The end of the at least one line of the connection cable, by way of the connecting means, is at least partially embedded into the holder, so that a preform is produced, wherein the at least one connecting point for the connection to the sensor element is cut out. After contact is made with the sensor element, the holder comprising the sensor element can be encapsulated by injection molding with a plastic sleeve.

SUMMARY

The holder for a sensor unit having the features disclosed herein and the corresponding sensor unit for a vehicle have the advantage that a new process chain is possible which allows the design of a plug module to be separate from the electrical contact-making operation until final customer application. As a result, the thermoplastic injection-molding process can be optimized for the specific application. Therefore, for example, the processed data for the plug module, such as plug outer contour, plug inner contour etc., can be optimized without influencing the measuring transducer. The customer-specific application plug, which is required for connection to the vehicle, is implemented by a variable connecting concept which allows further modularity of the sensor unit. By virtue of separation into the constituent parts holder, measuring transducer, plug module and injection-molded encapsulation, the process times for the thermoplastic injection-molding process can advantageously be reduced to such an extent that low cycle times and therefore high manufacturing volumes can be achieved with a minimum number of cavities and a small tool size. Therefore, embodiments of the present disclosure advantageously render possible short cycle times for the injection-molding encapsulation processes and an increase in automation on the sensor side. In addition, a high level of standardization and, as a result, a smaller number of tools for the holder can be achieved. Furthermore, a mechanical standard interface between the plug module and the orientation component can be used, which allows the orientation component to be inserted into a corresponding receptacle in the plug module by way of the oriented second ends of the at least two busbars or the oriented external interface before the injection-molding encapsulation process. As a result, the same conditions are always produced during encapsulation by injection molding and sealing off of the plug module and of the holder. Variations in the plug modules or the outgoing direction of the second ends of the at least two busbars or the external interface can be implemented in a simple manner by changing the orientation of the orientation component. Here, the orientation of the orientation component with respect to the orientation of the holder or of the first ends of the at least two busbars can be matched to the corresponding plug module by means of rotational and/or tilting movements by means of a gripping tool of a robot.

In addition, a customer-specific variance in the applications in the form of geometric requirements and/or additional requirements such as, for example, sealing-off functions or fastening functions can be realized in a simple manner by fastening modules which can be fitted or are attached by injection molding and have no influence on internal components of the sensor unit. The fastening module, which comprises a lug and an injection-molded bush for example, can be integrally formed onto the plug module or onto the injection-molded encapsulation. In addition, various ASIC packages, such as BGA (Ball Grid Array) for example, can be implemented during the manufacture of a preassembled measuring transducer which comprises a sensor element and a sensor circuit.

Embodiments of the present disclosure provide a holder for a sensor unit, comprising at least two busbars. An internal electrical interface to a measuring transducer is formed at first ends of the at least two busbars, and an external electrical interface for a plug module is formed at second ends of the at least two busbars. Here, an orientation component engages around the at least two busbars and is arranged between the internal electrical interface and the external electrical interface, wherein an orientation of the orientation component defines an outgoing direction of the second ends of the at least two busbars and of the external electrical interface.

In addition, the disclosure proposes a sensor unit for a vehicle, comprising a holder of this kind, a measuring transducer and a plug module.

Furthermore, the disclosure proposes an assembly method for a sensor unit of this kind which comprises a holder comprising at least two busbars, a measuring transducer and a plug module. An internal electrical interface to the measuring transducer is formed at first ends of the at least two busbars, and an external electrical interface for the plug module is formed at second ends of the at least two busbars. Here, an orientation component, which engages around the at least two busbars and is arranged between the internal electrical interface and the external electrical interface, is oriented and as a result defines an outgoing direction of the second ends of the at least two busbars and of the external electrical interface.

Advantageous improvements to the holder for a sensor unit, the sensor unit for a vehicle, and the assembly method for a sensor unit of this kind are possible owing to the measures and developments disclosed herein.

It is particularly advantageous that the at least two busbars can each have a deformation region. The at least two busbars can each be rotated and/or angled away in the deformation region, so that the orientation of the second ends of the at least two busbars and of the external electrical interface can differ from the orientation of the first ends of the at least two busbars and of the internal electrical interface. As a result, the outgoing direction of the second ends of the at least two busbars can be matched in a simple manner to the associated plug module.

In an advantageous refinement of the holder, the first ends of the at least two busbars can each be designed as planar contact elements by way of which electrical contact can be made with the measuring transducer. In addition, a main body can engage around the at least two busbars in the region of the internal electrical interface excluding the contact elements and form a receptacle for the measuring transducer. Furthermore, the deformation regions of the at least two busbars are arranged between the orientation component and the main body.

In a further advantageous refinement of the holder, the second ends of the at least two busbars can each be designed as contact pins of the plug module, with which contact pins electrical contact can be made by way of mating contacts of a plug-in module. As a result, the plug module can be manufactured without electrical contacts or pins. The contact pins are part of the sensor module or holder.

In an advantageous refinement of the sensor unit, electrical contact can be made with the measuring transducer by way of the planar contact elements of the at least two busbars. In addition, the measuring transducer can be placed into the receptacle in the main body.

In a further advantageous refinement of the sensor unit, the orientation component can be inserted into a receptacle of the plug module. As a result, the holder can be connected in a simple manner to the plug module before an injection-molding encapsulation process.

In a further refinement of the sensor unit, the plug module, the holder and the orientation component can be at least partially surrounded by a plastic injection-molded encapsulation. In addition, a fastening module can be integrally formed onto the plug module or onto the plastic injection-molded encapsulation.

In a further advantageous refinement of the assembly method, the orientation component and the second ends of the at least two busbars can be inserted into a plug module. In addition, the second ends of the at least two busbars can form contact pins in a receiving space of the plug module, it being possible for electrical contact to be made with said contact pins by way of mating contacts of a plug-in module which can be inserted into the receiving space.

Exemplary embodiments of the disclosure are illustrated in the drawing and will be explained in more detail in the following description. In the drawing, identical reference symbols denote components or elements which perform the same or similar functions.

DETAILED DESCRIPTION

Figure 1:
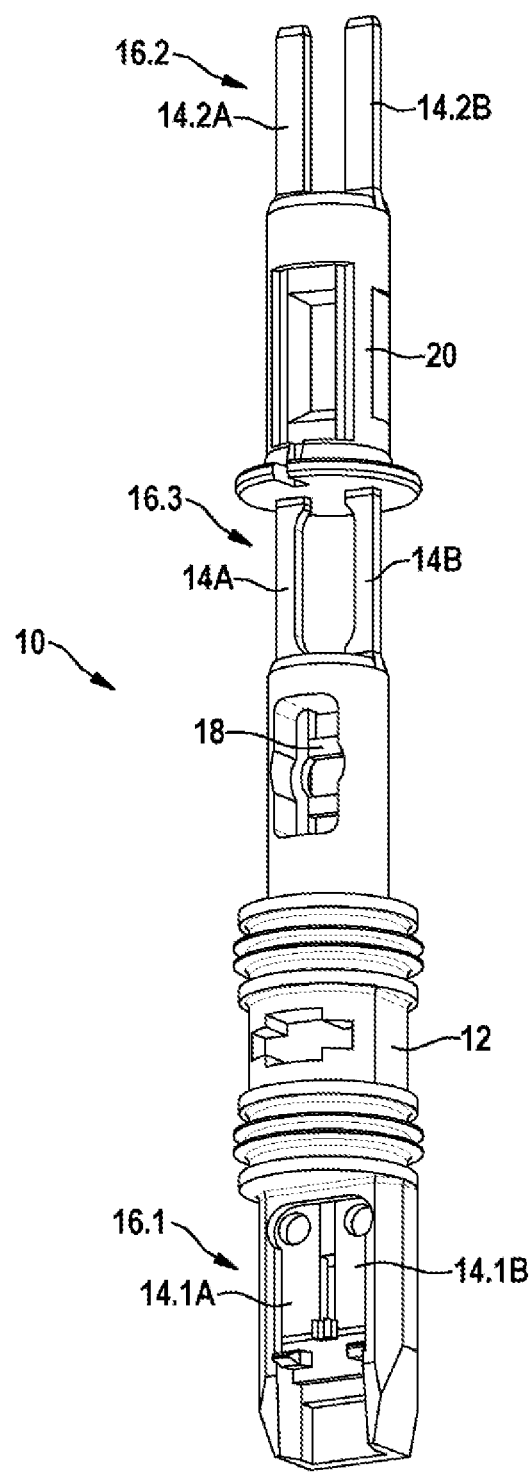
FIG. 1 shows a schematic perspective illustration of an exemplary embodiment of a holder according to the disclosure for a sensor unit in an initial state.

As is shown in FIGS. 1 to 7, the illustrated exemplary embodiments of a holder 10, 10A, 10B, 10C according to the disclosure for a sensor unit (1) each comprise at least two busbars 14A, 14B. An internal electrical interface 16.1 to a measuring transducer 3 is formed at first ends of the at least two busbars 14A, 14B. An external electrical interface 16.2, 16.2A, 16.2B, 16.2C for a plug module 5 is formed at second ends of the at least two busbars 14A, 14B. Here, an orientation component 20 engages around the at least two busbars 14A, 14B and is arranged between the internal electrical interface 16.1 and the external electrical interface 16.2, 16.2A, 16.2B, 16.2C. An orientation of the orientation component 20 defines an outgoing direction of the second ends of the at least two busbars 14A, 14B and of the external electrical interface 16.2, 16.2A, 16.2B, 16.2C.

In the illustrated exemplary embodiments, the holder 10, 10A, 10B, 10C has in each case two busbars 14A, 14B with a deformation region 16.3, 16.3A, 16.3B, 16.3C. The two busbars 14A, 14B can each be rotated and/or angled away in the deformation region 16.3, 16.3A, 16.3B, 16.3C, so that the orientation of the second ends of the two busbars 14A, 14B and of the external electrical interface 16.2, 16.2A, 16.2B, 16.2C can differ from the orientation of the first ends of the two busbars 14A, 14B and of the internal electrical interface 16.1. As a result, the outgoing direction of the second ends of the two busbars 14A, 14B and of the external electrical interface 16.2, 16.2A, 16.2B, 16.2C can be matched in a simple manner to the customer-specific plug module 5 which is required for connection to the vehicle.

The illustrated exemplary embodiments of the holder 10, 10A, 10B, 10C differ in terms of the orientation of the second ends of the two busbars 14A, 14B and of the external electrical interface 16.2, 16.2A, 16.2B, 16.2C from the orientation of the first ends of the two busbars 14A, 14B and of the internal electrical interface 16.1.

As is further shown in FIG. 1, the orientation of the two ends of the two busbars 14A, 14B and of the external electrical interface 16.2 corresponds to the orientation of the first ends of the two busbars 14A, 14B and of the internal electrical interface 16.1 in the illustrated initial state.

Figure 2:
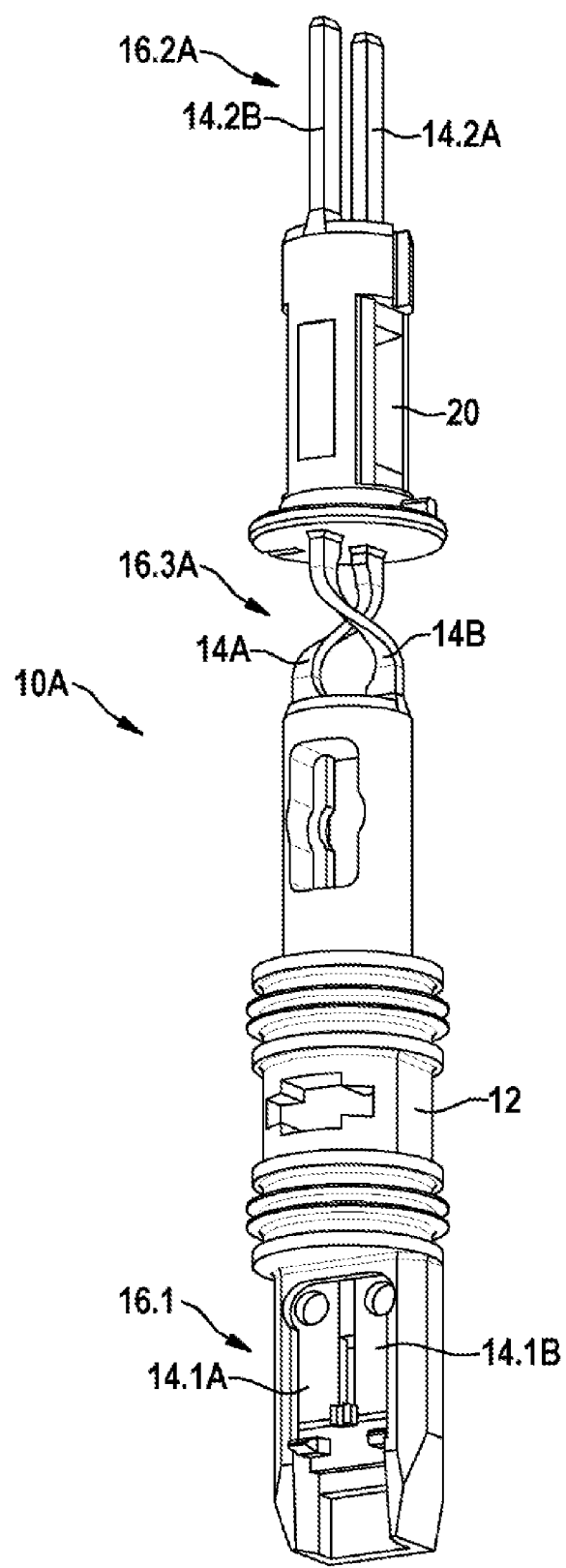
FIG. 2 shows a schematic perspective illustration of the holder according to the disclosure from FIG. 1 in a rotated first assembly state.

As is further shown in FIG. 2, the second ends of the two busbars 14A, 14B and the external electrical interface 16.2A are rotated through 90° about a longitudinal axis of the holder 10A in relation to the first ends of the two busbars 14A, 14B and to the internal electrical interface 16.1 in the illustrated first assembly state.

Figure 3:
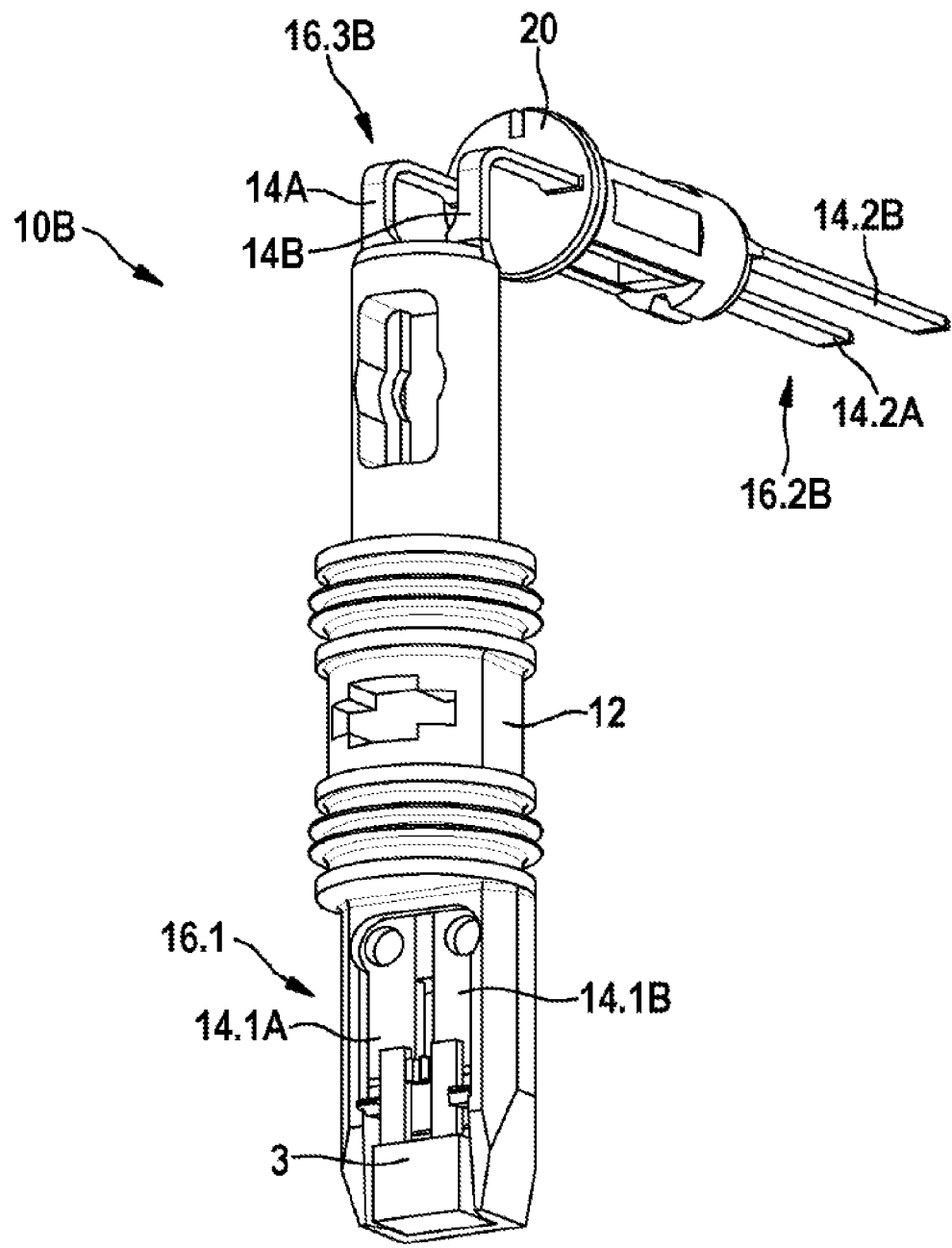
FIG. 3 shows a schematic perspective illustration of the holder according to the disclosure from FIG. 1 in an angled-away second assembly state.

As is further shown in FIG. 3, the second ends of the two busbars 14A, 14B and the external electrical interface 16.2B are angled away through 90° in relation to the first ends of the two busbars 14A, 14B and to the internal electrical interface 16.1 in the illustrated second assembly state.

Figure 4:
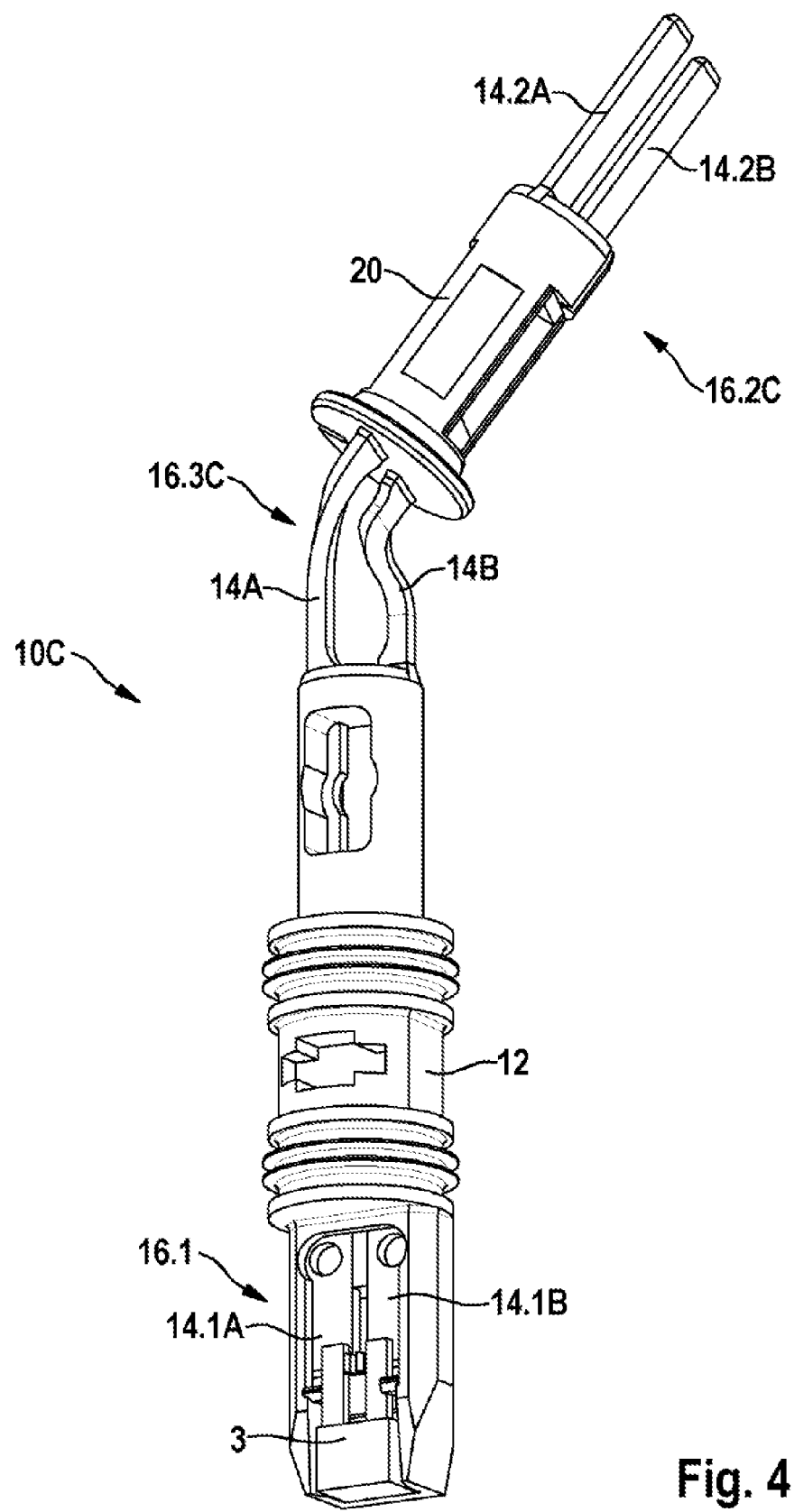
FIG. 4 shows a schematic perspective illustration of the holder according to the disclosure from FIG. 1 in a rotated and angled-away third assembly state.
Figure 5:
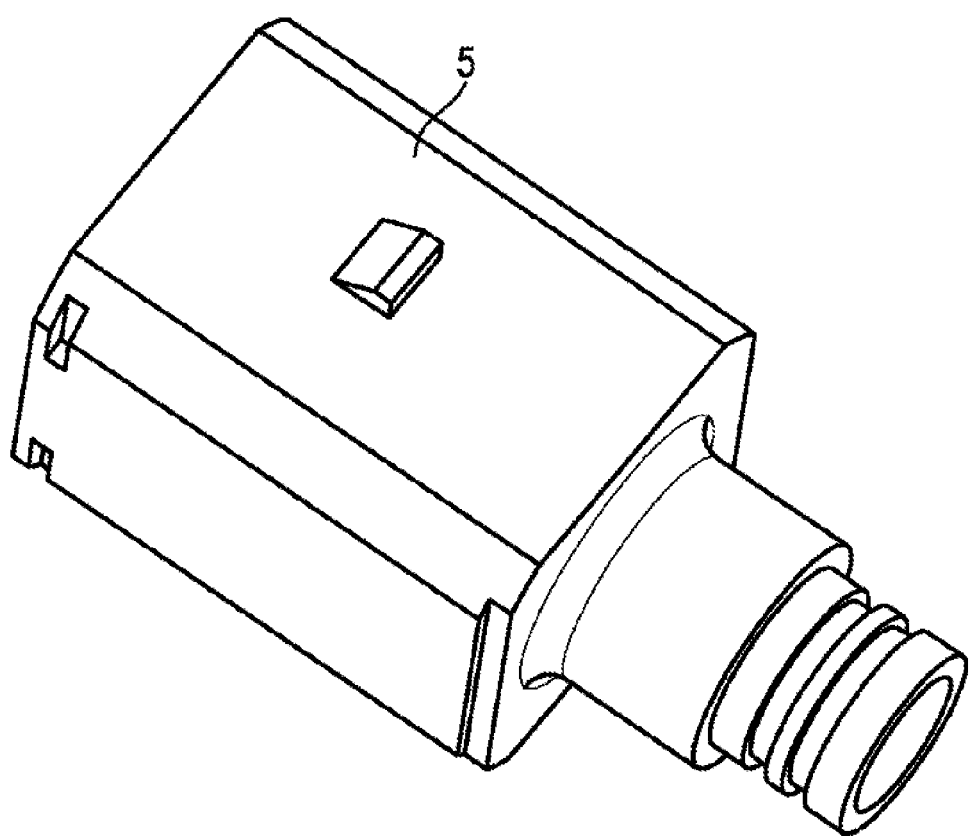
FIG. 5 shows a schematic perspective illustration of an exemplary embodiment of a plug module for a sensor unit according to the disclosure for a vehicle.

As is further shown in FIG. 4, the second ends of the two busbars 14A, 14B and the external electrical interface 16.2C are rotated through 45° about a longitudinal axis of the holder 10A in relation to the first ends of the two busbars 14A, 14B and to the internal electrical interface 16.1 and angled away through 45° in relation to the first ends of the two busbars 14A, 14B and to the internal electrical interface 16.1 in the illustrated third assembly state.

As is further shown in FIGS. 1 to 4, the first ends of the at least two busbars 14A, 14B are each designed as planar contact elements 14.1A, 14.1B by way of which electrical contact is made with the measuring transducer 3. In addition, the holder 10, 10A, 10B, 10C comprises a main body 12 which engages around the at least two busbars 14A, 14B in the region of the internal electrical interface 16.1 excluding the contact elements 14.1A, 14.1B and forms a receptacle for the measuring transducer 3. As is further shown in FIG. 1, the main body 12 of the holder 10 is produced by the encapsulation by injection molding of a symmetrical pair of busbars 16A, 16B (for example S—CuSn6 or CuSn4), which are connected by means of connecting bridges 19, with plastic (for example PA612 or PPS). After this encapsulation by injection molding, the holder 10 with the internal electrical interface 14.1 and the external electrical interface 14.2 is created. In this holder 10, the connecting bridges 18, which are arranged in a window of the main body 12, between the busbars 14A, 14B are severed and the measuring transducer 3 is placed into a corresponding receptacle. In the exemplary embodiments illustrated in FIGS. 3, 4, 6 and 7, the measuring transducer 3 is connected to the planar contact elements 14.1A, 14.1B of the busbars 14A, 14B by means of welding in the region of the internal interface 16.1.

As is further shown in FIGS. 1 to 7, the deformation regions 16.3, 16.3A, 16.3B, 16.3C of the two busbars 14A, 14B are arranged between the orientation component 20 and the main body 12.

Figure 7:
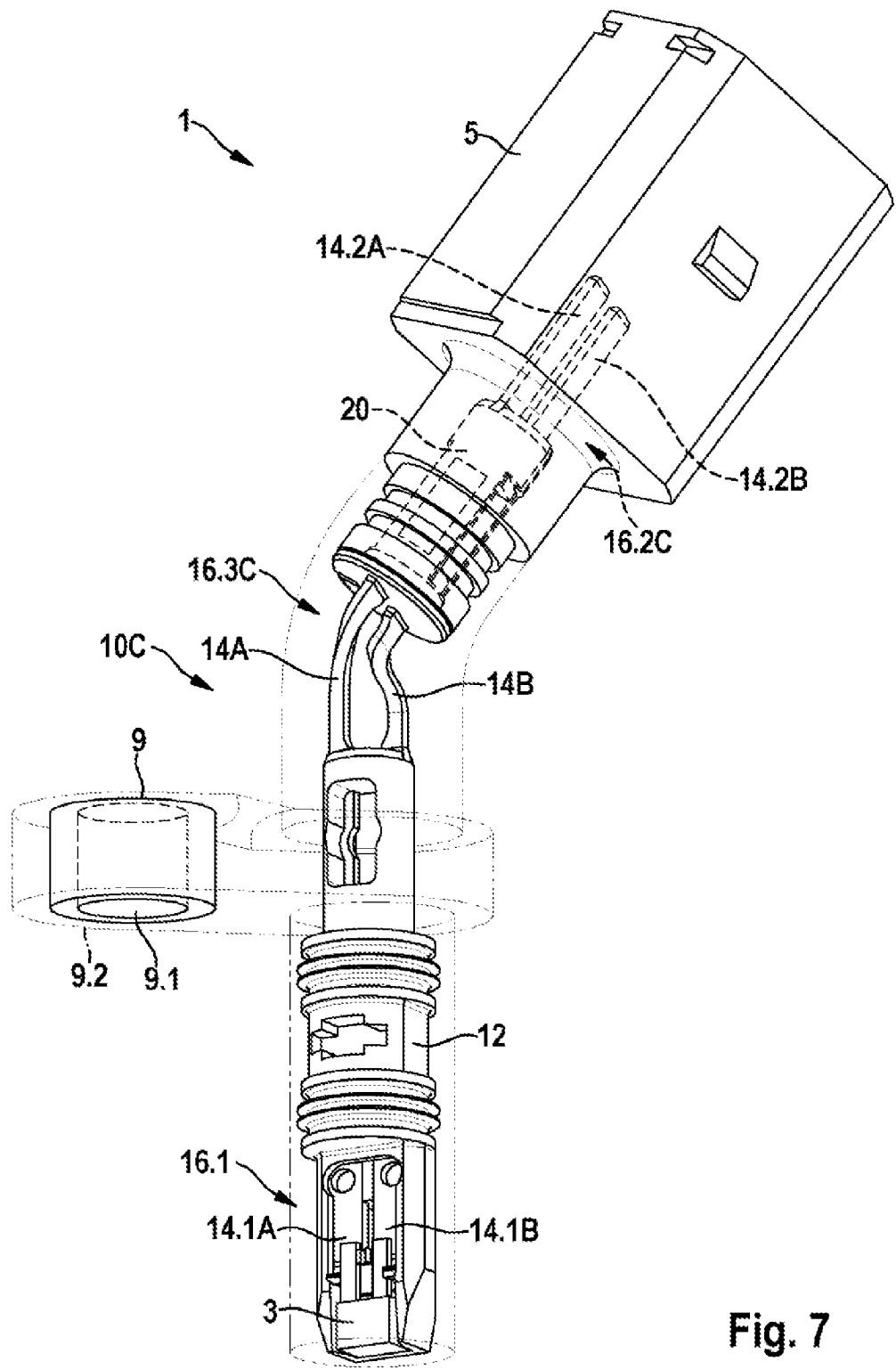
FIG. 7 shows a schematic perspective illustration of an exemplary embodiment of a sensor unit according to the disclosure comprising the holder according to the disclosure from FIG. 3 and the plug module from FIG. 5.

As is further shown in FIG. 7, the illustrated exemplary embodiment of a sensor unit 1 according to the disclosure for a vehicle comprises a holder 10C, which comprises two busbars 14A, 14B, a measuring transducer 3 and a plug module 5. The internal electrical interface 16.1 to the measuring transducer 3 is formed at first ends of the two busbars 14A, 14B. The external electrical interface 16.2C for the plug module 5 is formed at second ends of the two busbars 14A, 14B. In addition, the plug module 5, the holder 10C and the orientation component 20 are at least partially surrounded by a plastic injection-molded encapsulation 7, which is illustrated in a transparent manner. In addition, a fastening module 9, which comprises a bush 9.1 which is injection-molded into a lug 9.2, is integrally formed onto the plastic injection-molded encapsulation 7. Owing to this flexibility, different lug positions can be implemented for the customer. The variance in the sensor unit 1 which is produced as a result can be implemented by relatively simple tool interchanging sets. In an alternative exemplary embodiment, not illustrated, the fastening module 9 comprising the lug 9.2 and the bush 9.1 is integrally formed onto the plug module 5.

Figure 6:
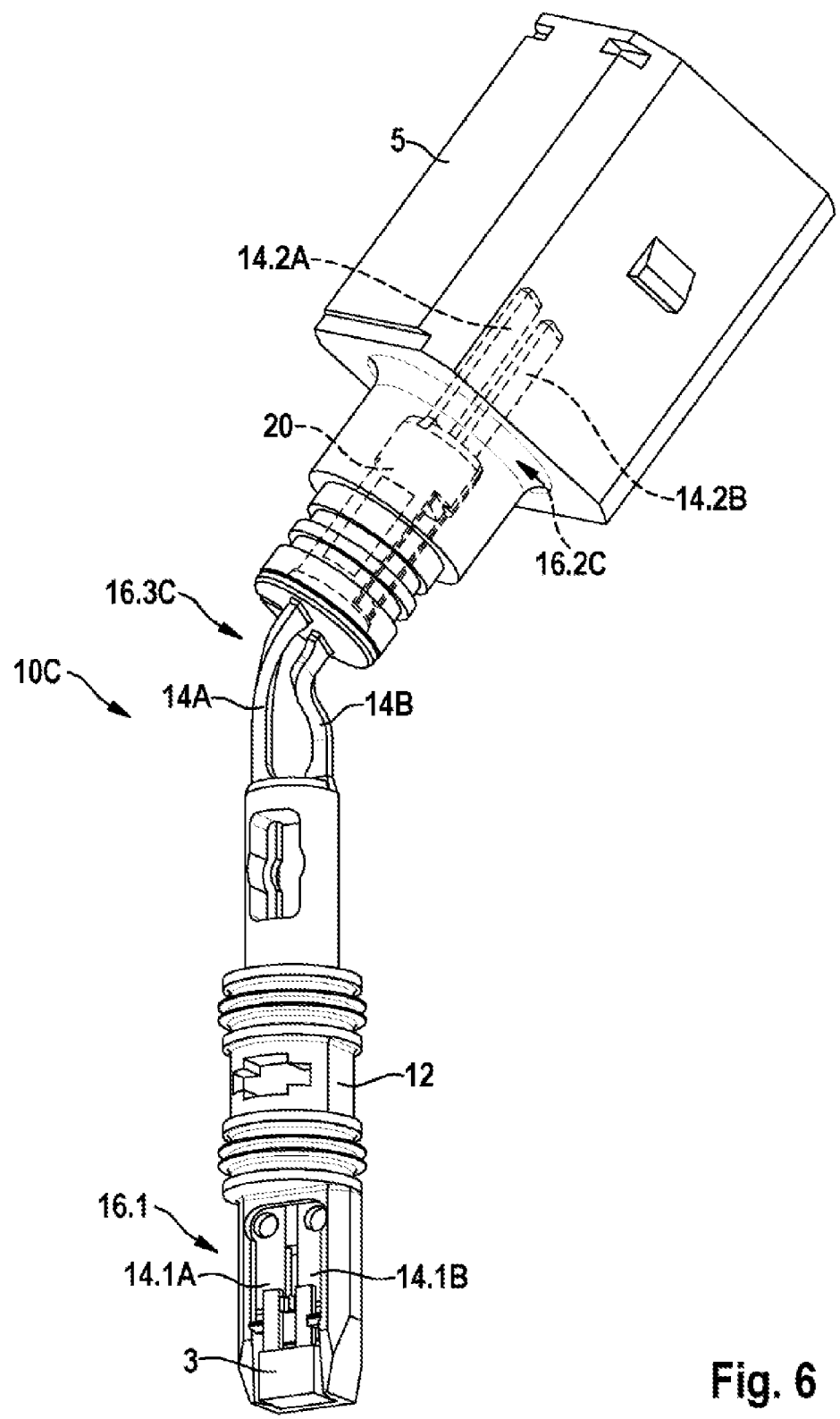
FIG. 6 shows a schematic perspective illustration of the holder according to the disclosure from FIG. 3 and the fitted plug module from FIG. 5.

As is further shown in FIG. 6, the oriented orientation component 20 with the oriented second ends, which are designed as contact pins 14.2A, 14.2B, of the two busbars 14A, 14B and the oriented external electrical interface 16.2C is inserted into a receptacle of the plug module 5 before the injection-molding encapsulation process. Electrical contact can be made with each of the second ends, which are designed as contact pins 14.1A, 14.1B of the plug module 5, of the two busbars 14A, 14B by way of mating contacts of a plug-in module which is plugged into the plug module 6.

In an assembly method according to the disclosure for a sensor unit 1 which comprises a holder 10, 10A, 10B, 10C comprising at least two busbars 14A, 14B, a measuring transducer 3 and a plug module 5, wherein an internal electrical interface 16.1 to the measuring transducer 3 is formed at first ends of the at least two busbars 14A, 14B, and an external electrical interface 16.2, 16.2A, 16.2B, 16.2C for the plug module 5 is formed at second ends of the at least two busbars 14A, 14B, an orientation component 20, which engages around the at least two busbars 14A, 14B and is arranged between the internal electrical interface 16.1 and the external electrical interface 16.2, 16.2A, 16.2B, 16.2C, is oriented and as a result defines an outgoing direction of the second ends of the at least two busbars 14A, 14B and of the external electrical interface 16.2, 16.2A, 16.2B, 16.2C.

After the orientation, the orientation component 20 and the second ends of the at least two busbars 14A, 14B are inserted into the plug module 5. As already stated above, the two ends of the at least two busbars 14A, 14B form contact pins 14.1A, 14.1B in a receiving space of the plug module 5, it being possible for electrical contact to be made with said contact pins by way of mating contacts of a plug-in module which can be inserted into the receiving space. The plug module 5, the holder 10, 10A, 10B, 10C and the orientation component 20 are then at least partially encapsulated by injection molding with plastic, wherein the fastening module 9 is integrally formed onto the plastic injection-molded encapsulation 7 in the illustrated exemplary embodiment.

Owing to the described construction, the sensor unit 1 can also differ in terms of manufacture with respect to the plug module 5, holder 10, 10A, 10B, 10C comprising measuring transducer 3 or sensor module and injection-molded encapsulation 7 and be illustrated separately. The plug module 5 is manufactured without contacts or pins; the contacts are part of the holder 10, 10A, 10B, 10C or sensor module. The bush 9.2 of the fastening module 9 is integrated in the injection-molded encapsulation 7 or, alternatively, in the plug module 5. As a result, the fastening module is handled outside the main production line.

The invention claimed is:

1. A holder for a sensor unit, comprising:
   at least two one-piece busbars, wherein an internal electrical interface to a measuring transducer is formed at first ends of the at least two busbars, and an external electrical interface for a plug module is formed at second ends of the at least two busbars; and
   an orientation component engaging around the at least two busbars and arranged between the internal electrical interface and the external electrical interface, an orientation of the orientation component defining an outgoing direction of the second ends of the at least two busbars and of the external electrical interface and matching said outgoing direction to the plug module, the orientation component configured such that the orientation is changeable.

2. The holder as claimed in claim 1, wherein each of the at least two busbars has a deformation region.

3. The holder as claimed in claim 2, wherein each of the at least two busbars is rotated and/or angled away in the deformation region, so that the orientation of the second ends of the at least two busbars and of the external electrical interface differs from an orientation of the first ends of the at least two busbars and of the internal electrical interface.

4. The holder as claimed in claim 1, wherein the first ends of the at least two busbars are each designed as planar contact elements configured to make electrical contact with the measuring transducer.

5. The holder as claimed in claim 4, further comprising:
   a main body engaging around the at least two busbars in a region of the internal electrical interface excluding the contact elements, the main body forming a receptacle for the measuring transducer.

6. The holder as claimed in claim 5, wherein
each of the at least two busbars has a deformation region; and
the deformation regions of the at least two busbars are arranged between the orientation component and the main body.

7. The holder as claimed in claim 1, wherein the second ends of the at least two busbars are each designed as contact pins of the plug module, the contact pins configured to make electrical contact with the plug module by way of mating contacts of a plug-in module.

8. A sensor unit for a vehicle, comprising:
a measuring transducer;
a plug module; and
a holder comprising:
at least two one-piece busbars, wherein an internal electrical interface to the measuring transducer is formed at first ends of the at least two busbars, and an external electrical interface for the plug module is formed at second ends of the at least two busbars; and
an orientation component engaging around the at least two busbars and arranged between the internal electrical interface and the external electrical interface, the orientation component defining an outgoing direction of the second ends of the at least two busbars and of the external electrical interface and matching said outgoing direction to the plug module, the orientation component configured such that the orientation is changeable.

9. The sensor unit as claimed in claim 8, wherein the at least two busbars include planar contact elements that electrically contact the measuring transducer.

10. The sensor unit as claimed in claim 8, wherein the holder further includes a main body having a receptacle, and the measuring transducer is placed into the receptacle in the main body.

11. The sensor unit as claimed in claim 8, wherein the plug module includes a receptacle, and the orientation component is inserted into the receptacle of the plug module.

12. The sensor unit as claimed in claim 8, wherein the plug module, the holder and the orientation component are at least partially surrounded by a plastic injection-molded encapsulation.

13. The sensor unit as claimed in claim 12, wherein a fastening module is integrally formed onto the plug module or onto the plastic injection-molded encapsulation.

14. An assembly method for a sensor unit having a holder with at least two one-piece busbars, a measuring transducer, and a plug module, the method comprising:
forming an internal electrical interface to the measuring transducer at first ends of the at least two busbars;
forming an external electrical interface for the plug module at second ends of the at least two busbars; and
orienting an orientation component, which engages around the at least two busbars and is arranged between the internal electrical interface and the external electrical interface, the orientation component defining an outgoing direction of the second ends of the at least two busbars and of the external electrical interface and matching said outgoing direction to the plug module.

15. The assembly method as claimed in claim 14, further comprising:
inserting the orientation component and the second ends of the at least two busbars into the plug module.

16. The assembly method as claimed in claim 15, wherein the second ends of the at least two busbars form contact pins in a receiving space of the plug module, the contact pins being configured to electrically contact mating contacts of a plug-in module that is configured to be inserted into the receiving space.

17. The assembly method as claimed in, claim 14, further comprising:
at least partially encapsulating the plug module, the holder and the orientation component by injection molding with plastic.

18. The assembly method as claimed in claim 17, further comprising:
integrally forming a fastening module onto the plug module or onto the plastic injection-molded encapsulation.

* * * * *